0;
United States Patent Office 3,407,118
Patented Oct. 22, 1968

3,407,118
PROCESS FOR MICROBIOLOGICAL SIDE CHAIN DEGRADATION OF STEROIDS OF THE PREGNANE SERIES
Jan de Flines and Willem Frederik van der Waard, Delft, Netherlands, assignors to Koninklijke Nederlandsche Gist- en Spiritusfabriek N.V., Delft, Netherlands, a corporation of the Netherlands
No Drawing. Filed Sept. 23, 1965, Ser. No. 489,742
Claims priority, application Great Britain, Sept. 25, 1964, 39,168/64
5 Claims. (Cl. 195—51)

ABSTRACT OF THE DISCLOSURE

A process for the microbiological side chain degradation of $9\beta,10\alpha$-steroids of the pregnane series having a 17 acetyl group which comprises subjecting them to the action under aerobic conditions of a degrading material selected from the group consisting of the microorganism *Helicosporium lumbricopsis*, enzyme systems thereof and spores thereof and recovering 17-oxygenated $9\beta,10\alpha$-steroids of the androstane series.

---

This invention relates to the preparation of steroid compounds, and is concerned with an improved method of preparing 17-keto or 17-hydroxy steroid compounds of the $9\beta,10\alpha$ series, the configuration of which is further explained below.

According to the present invention, a method of preparing a 17-keto or 17-hydroxy $9\beta,10\alpha$-steroid compound comprises subjecting a corresponding 20-keto-$9\beta,10\alpha$-steroid compound to the action of Helicosporium fungi or spores or oxygenating enzyme systems, thereof, to effect microbiological degradation of the 17-side chain of said 20-keto compound.

In the ensuing description, reference is made to the formula below, which shows a structural chemical formula.

The hydrogen atoms or methyl groups at the carbon atoms 8,9,10,13 and 14 of the steroids used as starting materials, or obtained as products, in practising the invention, have the same stereochemical configuration as the corresponding hydrogen atoms and methyl groups in dihydroisolumisterone. Castells et al. (Proc. of the Chemical Society, January 1958, p. 7) have shown that dihydroisolumeristone has the configuration $8\beta,9\beta,10\alpha$-methyl-$13\beta$-methyl, $14\alpha$.

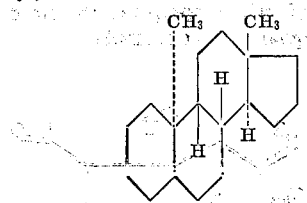

Accordingly, such compounds may be represented by formulae comprising a steroid skeleton as shown in the above formula showing the $9\beta,10\alpha$-configuration at carbon atoms 9 and 10, which contrasts with the configuration at these positions in the normal series of steroids, which is $9\alpha,10\beta$. In said formula, the $\beta$ position at the carbon atoms 8, 9 and 13 is indicated by a solid line, whereas the $\alpha$-position at the carbon atoms 10 and 14 is indicated by a broken line. It should be observed that the configuration of the hydrogen atoms or substituents at the other carbon atoms may be either $\alpha$, $\beta$ or planar if not otherwise specified.

The oxidizing enzyme system of Helicosporium fungi produce the desired 17-keto or 17-hydroxy-$9\beta,10\alpha$-steroids in an attractive yield. This result is surprising in that in precisely analogous reactions with normal steroids, much lower yields were obtained. The enzyme systems of Helicosporium fungi are able to convert a variety of 20-keto-$9\beta,10\alpha$-steroids into 17-keto or 17-hydroxy-$9\beta,10\alpha$-steroids. The Helicosporium fungus preferred for these reactions, is *Helicosporium lumbricopsis*, in particular *Helicosporium lumbricopsis* Linder Rapallo.

With the said micro-organisms the following conversions can easily be carried out:

(1) $9\beta,10\alpha$-pregn-4-ene-3,20-dione into
    $9\beta,10\alpha$-androst-4-ene-3,17-dione and
    $9\beta,10\alpha$-androst-4-en-17$\beta$-ol-3-one.
(2) $15\alpha$-hydroxy-$9\beta,10\alpha$-pregn-4-ene-3,20-dione into
    $15\alpha$-hydroxy-$9\beta,10\alpha$-androst-4-ene-3,17-dione and
    $15\alpha$-17$\beta$-dihydroxy-$9\beta,10\alpha$-androst-4-en-3-one.
(3) $11\alpha$-hydroxy-$9\beta,10\alpha$-pregn-4-ene-3,20-dione into
    $11\alpha$-hydroxy-$9\beta,10\alpha$-androst-4-ene-3,17-dione and
    $11\alpha,17\beta$-dihydroxy-$9\beta,10\alpha$-androst-4-ene-3-one.

In general, the 17-keto-$9\beta,10\alpha$-steroid is produced in far greater amounts than the 17($\beta$)-hydroxy-$9\beta,10\alpha$-steroid, which latter product is presumably formed as an intermediate.

Very suitable starting materials for practising the invention are $9\beta,10\alpha$-steroids containing a 3,20-diketo-4-dehydro grouping.

In these preferred starting materials additional double bonds may be present in 1 and/or 6 position. Further these starting materials may contain one or more hydroxy groups, for example at the 11 and/or 15 position. However, the presence of a 17-hydroxy group is excluded.

The invention may be practised using techniques similar to known microbiological conversions, for example by contacting the substrate under suitable conditions with a culture of a fungus as mentioned above and/or enzyme systems thereof. To this end, for example, first a culture of the fungus is caused to develop under aerobic conditions in a nutrient solution, after which a fermentation medium containing the steroid to be oxygenated, which can be added in solution or suspension, is subjected to the oxybiotic dissimilation activity of the mycelium which has been formed. The nutrient solution comprises essentially a carbon source and a nitrogen source. Suitable carbon sources include, for example, carbohydrates such as glucose, maltose or starch. Suitable nitrogen sources include organic nitrogen sources such as corn steep liquor or yeast extract, protein hydrolysates or amino acids, or inorganic nitrogen sources, for example ammonium salts or alkali metal nitrates.

To the medium containing the steroid to be oxygenated and one or more of the aforesaid nutrient sources may, if desired, be added an antifoam agent for example glyceryl monostearate. The pH of the medium may be adjusted in conventional manner and is preferably brought to a value between 6 and 7.

The most suitable fermentation temperature usually lies between 20° C. and 28° C., although higher or lower temperatures between 15° C. and 35° C. are, in general, also suitable.

The time required for the oxidation of the steroid may vary between wide limits, but usually an oxygenating period of 10 to 48 hours is an optimum period for complete conversion. The 17-oxygenated steroid compounds obtained after the termination of the oxygenating process may be separated from the medium and/or the mycelium in any of the conventional manners, preferably by extraction with an organic solvent not miscible with water, such as diethyl ether, ethyl acetate, amyl acetate, methyl isobutyl ketone or other suitable esters and ketones. Methyl isobutyl ketone is a particularly suitable extraction agent. The oxygenated steroid may also be isolated from the fermentation medium and purified by chromatographic methods, if desired in conjunction with extraction.

The 17-oxygenated steroids may also be formed by causing spores of the said micro-organisms to react with solutions or dispersions of the starting steroids mentioned above.

By way of illustration, a number of methods embodying the invention will now be described more fully in the ensuing specific examples.

In the examples the following ingredients were used.

(1) Micro-organism: *Helicosporium lumbricopsis* Linder Rapallo which was obtained from Centraal Bureau voor Schimmelcultures at Baarn, the Netherlands. The fungus was preserved on oats glucose agar.

(2) Growth media:

(a) 20-20 medium: A medium consisting of tap water in which has been dissolved per 1000 ml. 20 gms. of corn syrup liquor (dry substance content) and 20 gms. of glucose, the pH being adjusted to 6.5 by adding sodium hydroxide. The 20-20 medium was sterilised at 120° for 20 minutes.

(b) 5-5 medium: Same medium as 20-20 medium; but containing 5 gms. of corn syrup liquor and 5 gms. of glucose per litre instead of 20 gms. each of these substances.

Example I

The fungus was inoculated from oats glucose agar in 500 ml. portions of 20-20 medium in 2 litre Erlenmeyer flasks. After seven days' shaking the growth in said flasks was sufficient and inoculation of the main fermenter could be carried out, which was contained in twelve two-litre flasks, each containing 1 litre of sterile 5-5 medium. The inoculation percentage was again 5%. After 24 hours' shaking each flask had added to it 150 mgms. of 9β,10α-pregn-4-ene-3,20-dione dissolved in 8 mls. of acetone, after which fermentation was continued.

After 144 hours the substrate had been converted practically completely into 9β,10α-androst-4-ene-3,17-dione, with the by-product (intermediate product) of 9β,10α-androst-4-en-17β-ol-3-one.

After removal of the mycelium by filtering, the culture filtrate was extracted three times with half volumn portions of methyl isobutyl ketone. The bulked extracts were concentrated in vacuo to 350 mls., washed with aqueous sodium hydroxide and water and treated with activated carbon. The solution was evaporated in vacuo to a crystalline residue which consisted of 9β,10α-androst-4-ene-3,17-dione, contaminated with small quantities of 9β,10α-pregn-4-ene-3,20-dione and 9β,10α-androst-4-en-17β-ol-3-one. This residue was recrystallised twice from acetone-heptane and once from methanol/water, so that 560 mgms. of 9β,10α-androst-4-ene-3,17-dione was obtained, melting point 156-156.5° C.

$[\alpha]_D = -82°$ (c.=1, chloroform)
IR-spectrum (chloroform): 1733, 1667, 1614, cm.$^{-1}$.

Example II 11-hydroxy-9β,10α-pregn-4-ene-3,20-dione was subjected to the action of *Helicosporium lumbricopsis* Linder Rapallo by the same method as described in Example I. Also in this case twelve cultures, each one litre in volume, were obtained in two-litre flasks, to which the steroid was added 24 hours after the inoculation. Each flask received 300 mgms. of 11-hydroxy-9β,10α-pregn-4-ene-3,20-dione, dissolved in 20 mls. of acetone. This fermentation took much time. After nine days the substrate had been largely converted mainly into two products, which were 11-hydroxy-9β,10α-androst-4-en-17β-ol-3-one and 11-hydroxy-9β,10α-androst-4-ene-3,17-dione.

After removal of the mycelium by filtering, the culture filtrate was extracted three times with half-volume portions of methyl isobutyl ketone. The bulked extracts were concentrated in vacuo to 400 mls., washed with an aqueous solution of sodium hydroxide and then with water, treated with activated carbon and inspissated in vacuo to a crystalline residue.

The product was subjected to a counter-current extraction (cf. Craig) with 140 transports in toluene/50% methanol.

From the cells Nos. 10 to 20 165 mgms. of 11-hydroxy-9β,10α-androst-4-en-17β-ol-3-one was obtained by evaporation in vacuo, treatment with activated carbon, and recrystallisation from acetone-heptane and then from methyl isobutyl ketone. Melting point 235-236° C.

$[\alpha]_D = -128°$ C. (c.=1% chloroform).
UV max 242 mμ, ε=16,200 (methanol).
IR-spectrum (chloroform): 3612, 1665 and 1614 cm.$^{-1}$.

Elementary analysis: C, 75.04%; H, 9.07% (theor. for $C_{19}H_{28}O_3$: C, 74.96%; H, 9.27%).

From the cells Nos. 31 to 60, inspissation in vacuo followed by treatment with activated carbon and recrystallisation from acetone yielded heptane, 95 mgms. of 11-hydroxy-9β,10α-androst-4-ene-3,17-dione.

Melting point: 194-198° C.
IR-spectrum (chloroform): 3615, 1738, 1666, 1615 cm.$^{-1}$.

What is claimed is:

1. A method of producing a 9β,10α-androstane of the formula

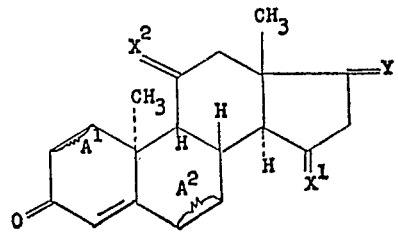

wherein $A^1$ and $A^2$ are each selected from the group consisting of a single bond and a double bond, $X^1$ and $X^2$ are each selected from the group consisting of $H_2$ and

and Y is selected from the group consisting of O,

and mixtures thereof, which comprises the steps of subjecting a 9β,10α-pregnane of the formula

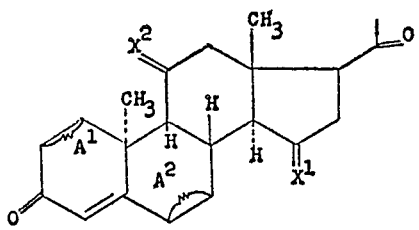

wherein $A^1$, $A^2$, $X^1$ and $X^2$ have the above-assigned values, to the action of a degrading material selected from the group consisting of microorganisms of the species *Helicosporium lumbricopsis*, enzyme systems thereof and spores thereof, and recovering said 9β,10α-androstane.

2. The method of claim 1 wherein said degrading material is selected from the group consisting of microorganism of the species *Helicosporium lumbricopsis*

Linder Rapallo, enzyme systems thereof and spores thereof.

3. The method of claim 1 wherein $A^1$ and $A^2$ each represent a single bond, $X^1$ and $X^2$ each represent $H_2$ and Y has the assigned values.

4. The method of claim 1 wherein $A^1$ and $A^2$ each represent a single bond, $X^2$ represents

$X^1$ represents $H_2$ and Y has the assigned values.

5. The method of claim 1 wherein said subjecting step is conducted under aqueous aerobic conditions.

References Cited

UNITED STATES PATENTS 2,981,659  4/1961  Fonken et al.

ALVIN E. TANENHOLTZ, *Primary Examiner.*